(12) United States Patent
Lambert et al.

(10) Patent No.: US 8,984,547 B2
(45) Date of Patent: Mar. 17, 2015

(54) ESTIMATING DEMOGRAPHIC COMPOSITIONS OF TELEVISION AUDIENCES

(75) Inventors: Diane Lambert, Berkeley Heights, NJ (US); Daniel J. Zigmond, Menlo Park, CA (US)

(73) Assignee: Google Inc., Mountain View, CA (US)

(*) Notice: Subject to any disclaimer, the term of this patent is extended or adjusted under 35 U.S.C. 154(b) by 215 days.

(21) Appl. No.: 13/083,663

(22) Filed: Apr. 11, 2011

(65) Prior Publication Data
US 2012/0260278 A1 Oct. 11, 2012

(51) Int. Cl.
H04N 7/16 (2011.01)
H04H 60/45 (2008.01)
H04H 60/66 (2008.01)
H04N 21/258 (2011.01)
H04N 21/24 (2011.01)

(52) U.S. Cl.
CPC .............. *H04H 60/45* (2013.01); *H04H 60/66* (2013.01); *H04N 21/25883* (2013.01); *H04N 21/2407* (2013.01)
USPC .................................. 725/9; 725/10; 725/12

(58) Field of Classification Search
USPC ................................................. 725/9, 10, 12
See application file for complete search history.

(56) References Cited

U.S. PATENT DOCUMENTS

| | | | |
|---|---|---|---|
| 5,550,928 A | 8/1996 | Lu et al. | |
| 7,212,979 B1 | 5/2007 | Matz et al | |
| 7,260,823 B2 * | 8/2007 | Schlack et al. | 725/9 |
| 7,895,626 B2 | 2/2011 | Georgis et al. | |
| 7,954,120 B2 | 5/2011 | Roberts et al. | |
| 2002/0129368 A1 * | 9/2002 | Schlack et al. | 725/46 |
| 2005/0273835 A1 * | 12/2005 | Steelberg et al. | 725/118 |
| 2006/0293954 A1 | 12/2006 | Anderson et al. | |
| 2007/0271586 A1 * | 11/2007 | Alperin | 725/109 |
| 2007/0288953 A1 | 12/2007 | Sheeman et al. | |
| 2008/0300965 A1 * | 12/2008 | Doe | 705/10 |
| 2009/0133058 A1 | 5/2009 | Kouritzin et al. | |
| 2009/0313232 A1 | 12/2009 | Tinsley et al. | |
| 2010/0083318 A1 | 4/2010 | Weare et al. | |
| 2010/0223215 A1 | 9/2010 | Karypis et al. | |
| 2011/0055009 A1 | 3/2011 | Kiveris | |

FOREIGN PATENT DOCUMENTS

JP 2011150380 A 8/2011

OTHER PUBLICATIONS

Zigmond et al., U.S. Appl. No. 13/277,827, filed Oct. 20, 2011, 34 pages.
Anderson et al., U.S. Appl. No. 13/077,493, filed Mar. 31, 2011, 34 pages.
Claritas. "PRIZM NE Segments" [online] [retrieved Aug. 12, 2011] 3 pages.
Nielsen "Television Measurement" [online] [retrieved Aug. 12, 2011] 2 pages.

(Continued)

*Primary Examiner* — Olugbenga Idowu
(74) *Attorney, Agent, or Firm* — Fish & Richardson P.C.

(57) ABSTRACT

Methods, systems, and apparatus, including computer programs encoded on a computer storage medium, for estimating demographic compositions of television audiences. In an aspect, audience demographics are estimated from viewing device log records and household demographic data describing demographic segments to which members of the households belong.

18 Claims, 7 Drawing Sheets

(56) References Cited

OTHER PUBLICATIONS

Rosenberg, Matt "You Are Where You Live," About.com [online] [retrieved Aug. 12, 2011] 1 page.

Wikipedia.com "Nielsen ratings" [online] [retrieved Aug. 12, 2011] 9 pages.

Wikipedia.com "Claritas Prizm" [online] [retrieved Aug. 12, 2011] 10 pages.

International Search Report mailed Aug. 27, 2013 (PCT/US2012/032683).

Extended European Search Report in European Application No. 12865330.0, mailed Aug. 4, 2014, 7 pages.

* cited by examiner

US 8,984,547 B2

ESTIMATING DEMOGRAPHIC COMPOSITIONS OF TELEVISION AUDIENCES

BACKGROUND

This disclosure relates to determining demographics of a program audience.

Advertisers often set exposure goals for advertising campaigns for advertising content, e.g., television ads, and devise strategies to achieve these goals, e.g., when to air the advertising campaign content. Accordingly, advertisers are very interested in knowing the demographic composition of program audiences, e.g., the percentage of male and female viewers for a given program, the age distributions of the male and female viewers, and the like.

The number of viewers of a television program can be determined in a variety of ways. For example, viewing device logs, such as set top box logs that include channel tune records, can be analyzed to determine the number of set top box devices tuned to particular television programs at particular times. Additionally, some device logs also include demographic segment information, e.g., data that describe demographic segments of a household audience. Alternatively, some households may be categorized to one or more segment clusters (e.g., Equifax demographic interest clusters or Nielsen PRIZM clusters) that describe the segments of the viewers. Typically the segment data are generated by a process that is different from the process that is used to generate ratings data for television programs, i.e., the segment data are determined independently from the ratings data. Panels or surveys can also be used to estimate the number of viewers by demographic groups.

However, it is sometimes impractical to sample enough households to determine the audience composition for every particular television program. Accordingly, while some ratings information may be available for particular television programs, information describing the audience demographics of the programs may not be available.

SUMMARY

In general, one innovative aspect of the subject matter described in this specification can be embodied in methods that include the actions of accessing viewer model data describing, for each of a plurality of demographic segments and for each of plurality of channels at a plurality of time blocks, a probability that a member of the demographic segment was viewing the channel at the time block; accessing household demographic data describing, for each of a plurality of households, one or more members of the household and, for each member of the household, one of the demographic segments to which the member belongs; generating, in a data processing apparatus, household model data from the viewer model data and the household demographic data, the household model data describing, for each of the households and for each demographic segment of the one or more members of the household, an expected number of viewers belonging to the demographic segment for each of the channels at each of the time blocks; and generating, in the data processing apparatus, audience model data from the household model data, the audience model data describing, for each demographic segment, an estimated fraction of an audience belonging to the demographic segment for each of the channels at each of the time blocks. Other embodiments of this aspect include corresponding systems, apparatus, and computer programs, configured to perform the actions of the methods, encoded on computer storage devices.

Particular embodiments of the subject matter described in this specification can be implemented to realize one or more of the following advantages. Audience demographics for television programs can be determined by leveraging off the reported channel tuning events and demographic composition data describing the demographic segments to which members of households belong. No additional data, such as complete ratings data, is needed to estimate the audience demographics. The process is fully automated, which reduces the cost associated with manually determining audience demographics of television programs (e.g., by use of extensive panels and surveys).

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION 1.0 System Overview

Figure 1:
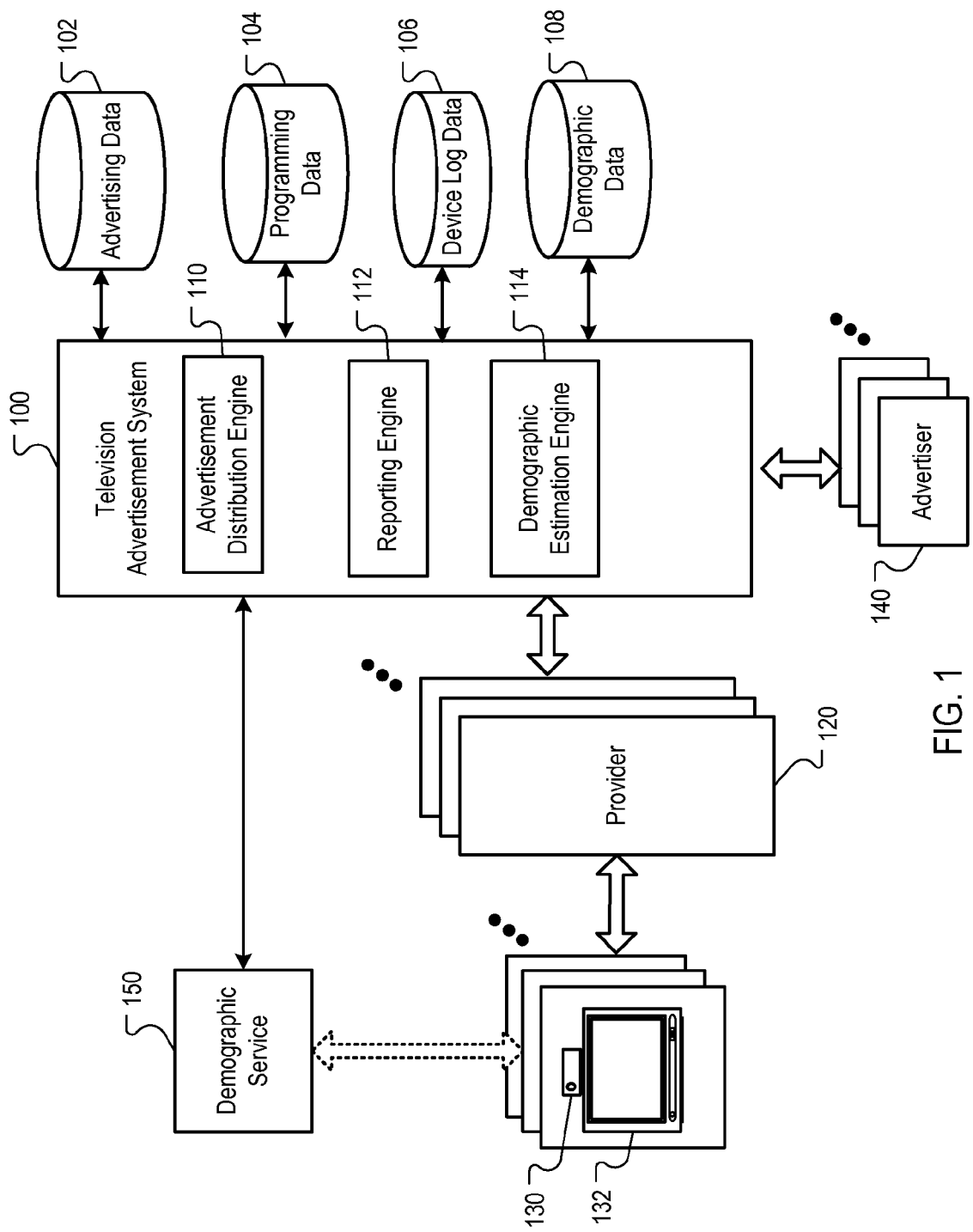
FIG. 1 is a block diagram of an example television advertising system.

FIG. 1 is a block diagram of an example television advertising system 100. The television advertisement system 100 delivers advertising campaign content, e.g., television ads/creatives, to an advertising population to facilitate operator monetization of programming and quantification of content delivery to target markets. The advertisement can be shown separately from a television program in the form of a television commercial, or can be shown concurrently with a television program in the form of an overlay or text stream on a portion of a television display.

The television advertisement system 100 is typically implemented in computer servers, and can provide and receive data over a network. Example networks include local area networks (LANs), wide area networks (WANs), telephonic networks, and wireless networks. Additionally, the television advertisement system 100 can, for example, communicate over several different types of networks, e.g., the Internet, a satellite network, and a telephonic network.

In general, the television advertisement system 100 receives television advertisements and campaign data from advertisers 140. An advertiser is entity that provides television advertisements, such as a commercial entity that sells products or services, an advertising agency, or a person. The television advertisement system 100 facilitates the provisioning of television advertisements to television providers 120. A television provider is an entity that facilitates the delivery of a television broadcast (e.g., the programming of a television network) to viewers, such as cable provider, a digital satellite provider, a streaming media provider, or some other media provider.

The television advertisement system 100 can also obtain viewing information related to viewing devices 130. Example viewing devices 130 include set top boxes, digital video recorders and tuners, and other television processing devices that facilitate the viewing of the television signal on a television device. In some implementations, logs related to viewing device 130 activity, e.g., set top box logs, can be anonymized to remove personal information related to viewing activities by the television advertising system or prior to being provided to the television advertisement system 100.

The viewing information can be provided by the television providers 120, or can be provided by third parties. In the example system 100 of FIG. 1, the viewing information is provided in the form of set top box logs from the television providers 120.

The system 100 can also receive household demographic data from data from a demographic service 150. The demographic data are data that describe segment characteristics of a viewing audience corresponding to each set top box log. The household demographic data describe, for each of a number of households, one or more members of the household and, for each member of the household, a demographic segment to which the member belongs. For example, each set top box log can be associated with a household, and the demographic data are used to determine the demographic segments to which viewers of the household belong. The demographic data can also be provided by other sources, e.g., by the providers 120, assuming the providers have the demographic data available.

In general, the demographic data describe D demographic segments. The demographic segments are defined such that each person falls into only one of the demographic segments. The segments, however, can be aggregated to form demographic groups, such as "adult males" or "adult males younger than 40," etc.

The television advertisement system 100 also includes one or more data stores to store set top box log data, ratings data, television advertisements and associated advertisement data. In some implementations, the television advertisement system 100 includes a television advertisement data store 102, a programming data store 104, a device log data store 106, and a household demographic data store 108.

The television advertisement data store 102 stores data defining television advertisements that can be broadcast or aired during an advertisement spot. Example television advertisements include video advertisements, banner advertisements, overlay advertisements, etc. The advertisement data store 102 also includes advertising campaign information for multiple advertisers. An advertising campaign describes an ad or a group of related ads, and conditions for airing the advertisement.

The programming data store 104 stores programming schedules and advertisement avails. The advertisement distribution engine 110 uses the programming schedules and advertisement avails to auction and schedule advertisements.

The device log data store 106 stores, for example, data logs/television channel tune data from viewing devices 130. The channel tune data that include channel identifiers, e.g., channel tune records, identifying channels for programming that was presented on televisions 132 by use of the viewing devices 130, such as may occur when the viewing device 130 is processing video data to record and/or display. The channel tune data can also include device time data identifying times and/or durations at which (or with which) a viewing device was used to present the programming of the channels, and device identifiers identifying the viewing devices 130. The log data can be anonymized to protect individual users, through, for example, removal of personally identifying information in a manner that still allows the viewing device logs to be associated with corresponding demographic data.

The channel tune data are typically processed to remove false positive and false negative reporting events. For example, events that correspond to a particular channel being tuned to for multiple hours into the early morning can be ignored, as it is likely that a viewer may have fallen asleep. Likewise, events that correspond to rapid changes of from one channel to the next can be ignored as it is likely the viewer is "channel surfing" and not watching the programing on channels that are tuned to for only several seconds or less.

The channel tune data thus specify, for each viewing device, channels to which the viewing device tuned to and a time that the viewing device tuned to the channel. Using these tune times and channel information, the television advertisement system 100 determines which channels were being presented for particular channel time blocks. As used herein, the term "channel time block", or simply "time block" refers to an identifiable broadcast for a time period. Thus, a channel time block can refer to a television program that aired on a particular network at a particular time, or can refer to a particular provider channel (and thus refer to a network) for a particular block of time, e.g., 15 minute intervals. As used in this specification, the term "channel" is assumed to be resolved to a network.

The demographic data store 108 stores the household demographic data provided by the demographic service 150.

The television advertisement system 100 also includes an advertisement distribution engine 110, a reporting engine 112, and a demographic estimation engine 114. The advertisement distribution engine 110 is configured to provide approved advertisements to the television provider 120. In some implementations, the advertisements are provided to the television provider 120 in advance of airing the advertisements. In some implementations, after receiving a request for any new advertisements to be downloaded for airing by the provider 120, the television advertisement system 100 labels the download with a particular ID that can be used later to identify the advertisement and the distribution engine 110 can deliver the advertisement to the appropriate provider 120.

The reporting engine 112 can, for example, receive advertisement reporting information from the provider 120 and determine whether the selected television advertisement aired based on the advertisement report information (an advertisement may not air due to a programming irregularity, e.g., a sporting event going beyond a scheduled broadcast, an interruption to scheduled programming due to breaking news), and generate reports from the reporting information. The reports can include impressions and demographics of the viewing audiences. The demographics of the viewing audiences are determined by the demographic estimation engine 114, as described in more detail below.

2.0 Demographic Estimation Overview

Figure 2:
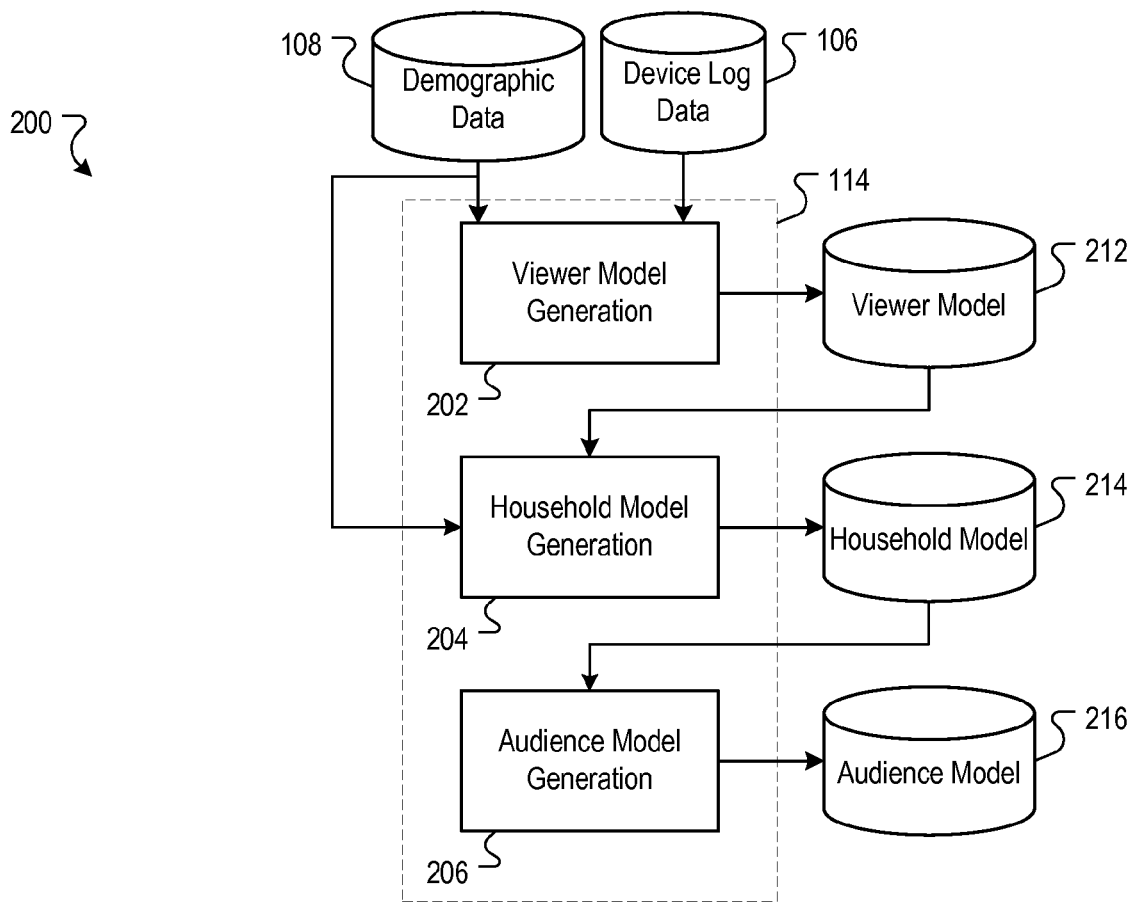
FIG. 2 is a block diagram illustrating a process of estimating demographic compositions of television audiences.
Figure 3:
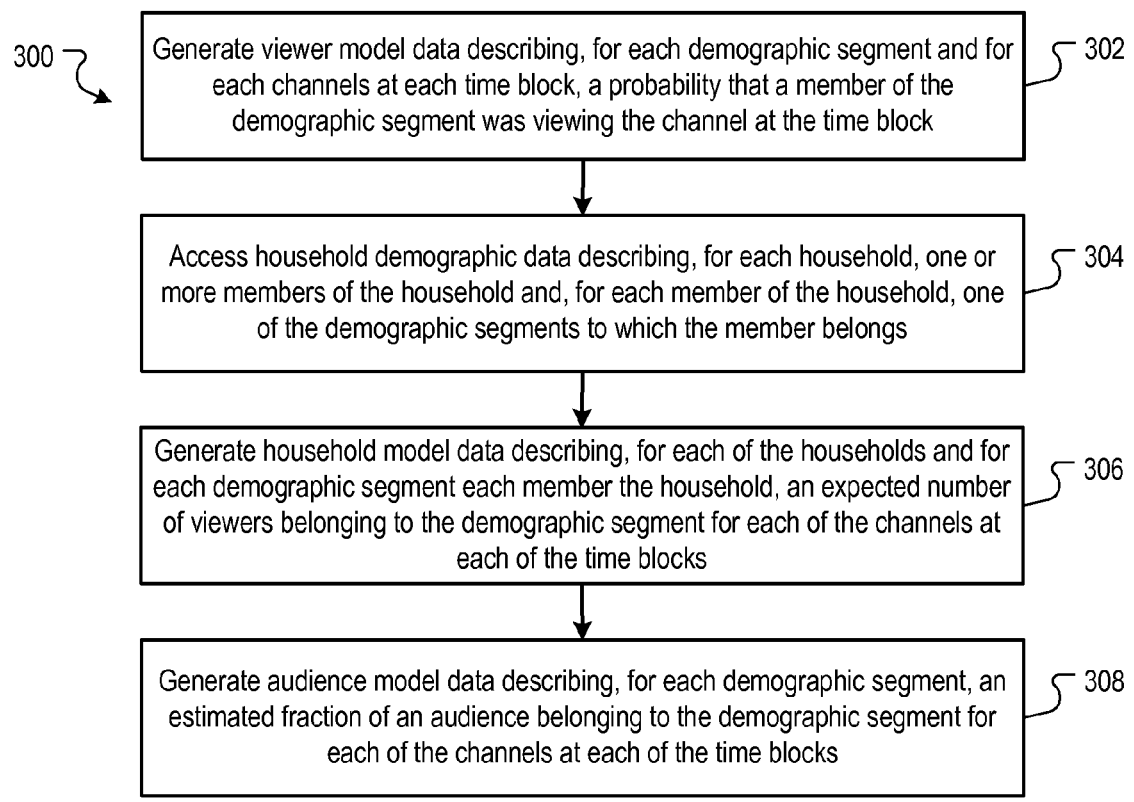
FIG. 3 is a flow diagram of an example process for estimating demographic compositions of television audiences.

The process by which the demographic estimation engine 114 determines the demographic composition of television audiences for unrated channel time blocks is better understood with reference to FIG. 2, which is a block diagram 200 illustrating an estimation of demographic compositions of television audiences, and FIG. 3, which is a flow diagram of an example process 300 for estimating demographic compositions of television audiences.

In this example implementation, there are three modeling components—a viewer model 212, a household model 214, and an audience model 216. Each model 212, 214 and 216 is generated by respective model generation sub-processes 202, 204 and 206 that are executed as part of the demographic estimation engine 214. Each of the sub-processes 202, 204 and 206 can be respectively implemented in respective software engines, e.g., a viewer modeler, a household modeler, and an audience modeler.

The viewer model generation process 202 accesses the demographic data 108 and the device log data 106 to generate the viewer model 212. The viewer model 212 is a per-viewer model that specifies the probability that someone in a demographic segment s is watching a particular network N in time block t. The viewer model can be determined in a variety of ways, and one example process, described in more detail below, generates a viewer model from channel tune records from viewing devices associated with households of size one (i.e., households in which only one viewer is determined to reside).

The household model generation process 204 accesses the viewer model 212 and the demographic data 108 and generates the household model 214. The household model 214 specifies the probability that each member of a household that has a viewing device 130 tuned to network N in time block t was watching N at a time within the time block t. For each household, the probabilities are estimated from the viewer model 212, household demographic data 108, and the channel tune records for each viewing device 130 within the household.

The audience model generation process 206 accesses the household model 214 and generates the audience model 216. The audience model 216 describes, for each demographic segment, an estimated fraction of an audience belonging to the demographic segment for each of the channels at each of the time blocks. The audience model 216 can optionally be adjusted to account for sampling bias when determining audience demographics.

FIG. 3 illustrates one example process 300 for generating the audience model 216. The process 300 can be implemented in a data processing apparatus of one or more computers and memory storage devices that are used to realize the demographic estimation engine 114.

The process 300 generates viewer model data describing, for each demographic and for each channel at each time block, a probability that a member of the demographic segment was viewing the channel at the time block (302). Examples of generating the viewer model are described with reference to section 3.0 and FIG. 4 below.

The process 300 accesses household demographic data describing, for each of the households, one or more members of the household and, for each member of the household, the demographic segment to which the member belongs (304). Using the household demographic data and the viewer model data, the process 300 generates household model data describing, for each of the households and for the demographic segment of each member of the household, an expected number of viewers belonging to the demographic segment for each of the channels at each of the time blocks (306). Examples of generating the household model are described with reference to section 4.0 and FIG. 5 below.

The process 300 generates an audience model data describing, for each demographic segment, an estimated fraction of an audience belonging to the demographic segment for each of the channels at each of the time blocks (308). Examples of generating the audience model are described with reference to section 5.0 and FIG. 6 below.

3.0 Viewer Model

In some implementations, the viewing model 212 is derived from the demographics of viewers in one person households. This is because all viewing by such household can be attributed to just one person, and thus to the demographic d that the person, and thus the household, belongs. Suppose that the data include $H_{1d}$ households of size one that belong to demographic d, and $H_{1dNt}$ of these have a viewing device that is tuned to network N in time block t. An estimate of the probability that someone in demographic d is viewing N in time block t is the following ratio:

$$\hat{P}(\text{viewing } N \text{ at } t \mid \text{in demographic } d) = P_{dNt} = \frac{H_{1dNt}}{H_{1d}}. \quad (1)$$

The value of $H_{1d}$ in the denominator includes everyone in demographic d in a one-person household specified in the demographic data 108, and not just those with a viewing device 130 tuned to the some network at time t.

Other estimates can be used, such as in the situations where programming is constant from day-to-day or week-to-week, and the appeal of a program to any demographic segment changes slowly over time. For example, the viewer model given from equation (1) can be smoothed and tracked over time with exponentially weighted moving averaging:

$$\hat{P}(\text{view } N \text{ at } t \mid \text{in demographic } d) = \alpha \frac{H_{1dNt}}{H_{1d}} + (1 - \alpha)\hat{P}_{old}$$

Where $\hat{P}_{old}$ is the estimate for network N a week earlier, for example. Estimating the probabilities from a subsample of the one-person households can also be done, as long as each household in the subsample is accounted for during the processing.

Figure 4:
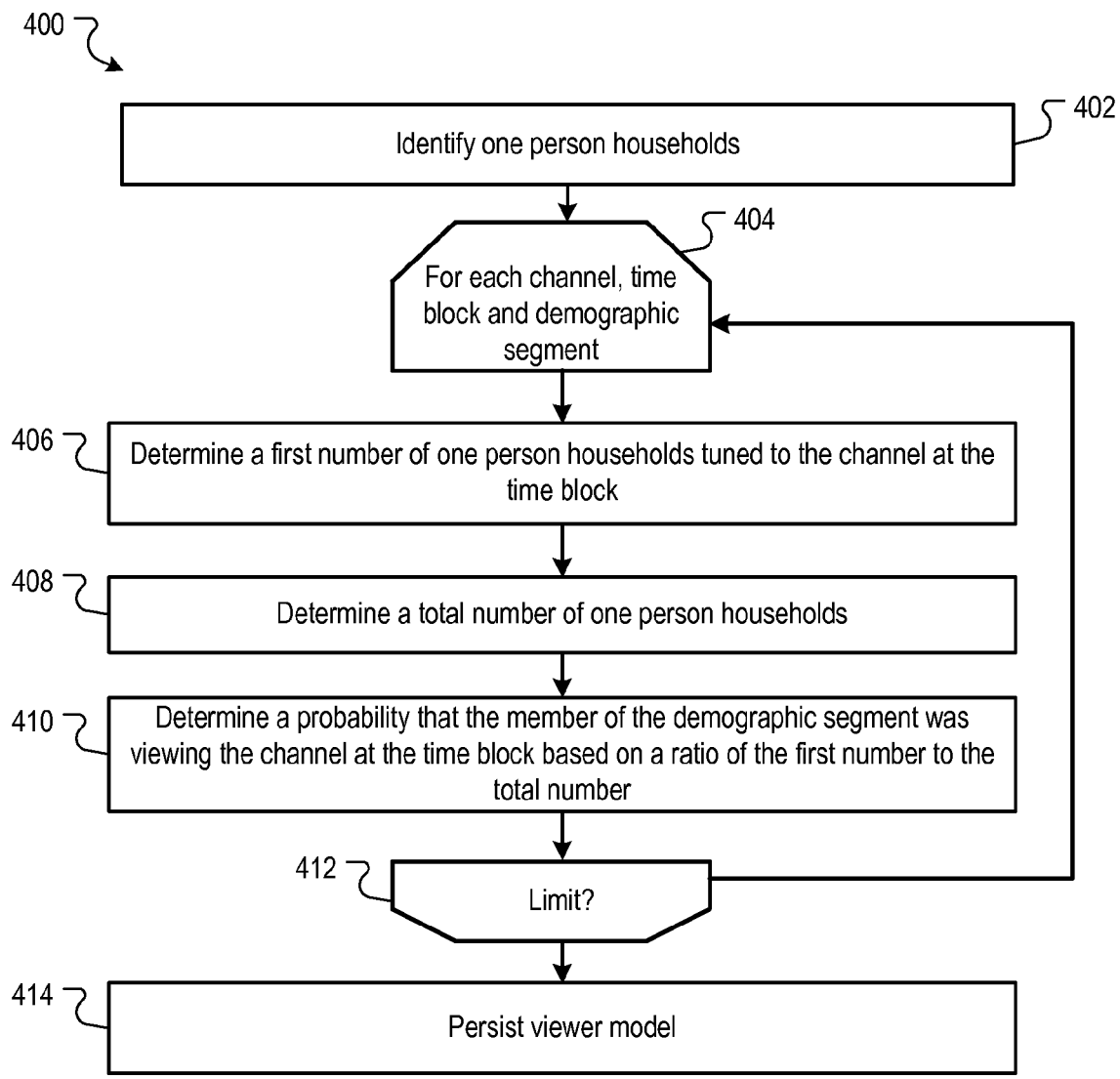
FIG. 4 is a flow diagram of an example process for generating a viewer model.

FIG. 4 is a flow diagram of an example process 400 for generating a viewer model. The process 400 can be implemented in a data processing apparatus of one or more computers and memory storage devices that are used to realize the demographic estimation engine 114.

The process 400 identifies one person households (402). For example, one-person households can be identified from the demographic data 108, and the corresponding channel tune data for viewing devices 130 associated with the households can also be identified. Because each person belongs to only one demographic segment, the process 400 can determine, for each of the channels, and for each time block of each channel, and for each demographic segment (404), a probability that the member of the demographic segment was viewing the channel at the time block based on a ratio of the first number to the total number.

For example, for a particular channel, at a particular time block and for a particular demographic segment, the process 400 determines a first number of one person households tuned to the channel at the time block, wherein each of the number of one person households has a household member belonging to the demographic (406). This number is, for example, $H_{1dNt}$.

The process 400 then determines a total number of one person households in which each of the total number of households has a member belonging to the demographic segment (408). This number is, for example, $H_{1d}$.

The process 400 then determines, for the particular channel at the particular time block and for the particular demographic segment, the probability that a member of the demographic segment was viewing the channel at the time block based on a ratio of the first number to the total number (410).

Once all the channels, time blocks, demographic segments are processed (412), the demographic estimation engine 114 persists the viewer model (414).

4.0 Household Model

If a household has more than one member, then it cannot be determined from the channel tune information alone which person was watching an active viewing device 130. However, one member in the household might be more likely to view a particular network at particular times than another member of the household. Thus, instead of counting members in active households by demographic segment, the demographic estimation engine 114 sums "fractions" of people, where the fraction assigned to a person depends on how likely he or she is to be viewing the network at that time.

The demographic estimation engine 114 estimates the probability for each demographic in the household by assigning fractional audience demographics to the households. The fractional demographics are due to the fact that once it is determined that a person in the household is watching, the probability that a particular person is watching is no longer the probability computed under the viewer model. For example, in a household of size one, the number of viewers in one of the demographic groups must be one even though the probability of viewing N at t for any demographic group is likely to be less than one.

Once the demographic estimation engine 114 assigns everyone in a household a probability of viewing, the expected number of viewers in a demographic group is the sum of their probabilities. This sum is not affected by a lack of independence (i.e., if the people in the household do not choose what to view independently), because the expected value for the sum is the sum of the expected values, regardless of how complicated the multivariate probability distribution is.

4.1 Two Person Household with One Active Viewing Device

Assume a household has two people and only one active viewing device 130 during a particular time block t, and the viewing device is tuned to a particular network N. One person in the household belongs to demographic segment $d_1$ and the other to demographic segment $d_2$, where possibly $d_1 = d_2$.

From the viewer model, the probability that someone in demographic d is watching N at time t is $p_{dNt}$. Then the chance that the person in demographic $d_1$ is watching, given that someone in the household is watching is given by equation (2):

$$P(d_1 \mid d_1 \text{ or } d_2) = \frac{P(d_1 \text{ viewing } N \text{ at } t)}{P(d_1 \text{ or } d_2 \text{ viewing } N \text{ at } t)}$$

$$= \frac{P(d_1 \text{ viewing } N \text{ at } t)}{P(d_1 \text{ viewing } N \text{ at } t) + P(d_2 \text{ viewing } N \text{ at } t) - P(d_1 \text{ and } d_2 \text{ viewing } N \text{ at } t)}. \quad (2)$$

The probabilities $P(d_1$ viewing N at t) and $P(d_2$ viewing N at t) are provided by the viewer model. The probability that both are watching is given by the approximation of equation (3) below:

$$P(d_1 \text{ and } d_2 \text{ viewing } N \text{ at } t) = P(d_1 \text{ viewing } N \text{ at } t) \times P(d_2, \text{ viewing } N \text{ at } t). \quad (3)$$

Then the approximation of equation (2) is given by equation (4):

$$P(d_1 \mid d_1 \text{ or } d_2) \approx \frac{p_{d_1 Nt}}{p_{d_1 Nt} + p_{d_2 Nt} - p_{d_1 Nt} \times p_{d_2 Nt}}. \quad (4)$$

The approximation assumes independence. This assumption is valid in the case of if someone in the household choosing a network and the other person in the household independently decides whether to watch the network at the time block. Furthermore, the assumption of independence does not significantly affect accuracy if the probability that the person in $d_2$ is watching network N in time block t is much smaller than the probability for the person in d1, or vice versa, because the joint probability can never be larger than each of the marginal probabilities for each person.

4.2 Two Person Household with Two Active Viewing Devices

Assume a household has two people and two active viewing devices 130 during a time block t. Note that total number of viewing devices 130 in the household is unimportant; only the number of viewing devices 130 that are actually on and being used to present television programming during the time block affects the probabilities.

One viewing device is tuned to network N and the other is tuned to N*. The demographic estimation engine 116 determines probabilities of which person is watching programming for each particular viewing device according to the following relationship:

$$P(d_1 \text{ on } N, d_2 \text{ on } N^* \mid N, N^*) = \frac{P(d_1 \text{ on } N \text{ and } d_2 \text{ on } N^*)}{P(d_1 \text{ on } N, d_2 \text{ on } N^*) + P(d_1 \text{ on } N^*, d_2 \text{ on } N)}$$

$$\approx \frac{P(d_1 \text{ on } N) P(d_2 \text{ on } N^*)}{P(d_1 \text{ on } N) P(d_2 \text{ on } N^*) + P(d_1 \text{ on } N^*) P(d_2 \text{ on } N)}.$$

Assuming independence, the relationship is described by equation (5):

$$P(d_1 \mid d_1 \text{ or } d_2) \approx \frac{p_{d_1 Nt}}{p_{d_1 Nt} + p_{d_2 Nt} - p_{d_1 Nt} \times p_{d_2 Nt}}. \quad (5)$$

4.3 Households with More than Two People and Viewing Devices

The demographic estimation engine 114 uses a generalization to estimate the number of viewers per demographic d for a network N in time block t in a particular household. Again assuming independence, each household is represented by a vector $(n_1 \ldots n_D)$ of the number of people in the household in each of the demographic segments, where each vector element corresponds to a demographic segment. Most of the elements $n_j$ are zero, and the values, of all the elements sum to the number of people in the household.

Assume only one viewing device 130 in the household is active in time block t and it is tuned to network N. The per-viewer probabilities of viewing N at t for demographic segment d is $p_{dNt}$; d=1 . . . D. The expected number of people watching N at t in the household is, assuming independence, is given by equation (6):

$$E(\text{viewers in } d \mid \text{at least one in household}) = \frac{n_d p_{dNt}}{1 - \prod_{s=1}^{D} (1 - p_{sNt})^{n_e}}. \quad (6)$$

The product in the denominator is the probability that no one in the household is watching, which is the complement of "at least one person in the household is watching." Thus, equation (6) gives the same estimates as those given previously for two person households with one viewing device.

Likewise, in the case for two viewing devices 130 being simultaneously on and determined to be viewed in a household of more than two people, the denominator becomes the probability that at least one person is watching the viewing devices 130 and at least one person is watching the second viewing device 130. If the viewing devices 130 are on networks N and M, then the probability that at least one person is watching each of the viewing devices 130 is given by:

$$\left(1 - \prod_{s=1}^{D} (1 - p_{sNt})^{n_e}\right) \times \left(1 - \prod_{s=1}^{D} (1 - p_{sMt})^{n_e}\right)$$

Accordingly, the expected number of viewer E in the demographic d is given by:

$$\frac{n_d p_{dNt}}{\left(1 - \prod_{s=1}^{D} (1 - p_{sNt})^{n_e}\right) \times \left(1 - \prod_{s=1}^{D} (1 - p_{sMt})^{n_e}\right)}$$

With three or more viewing devices being watched simultaneously (e.g., k viewing devices), the denominator above is replaced by a product of k terms, and each term in the product is one minus a product over all D demographics.

Figure 5:
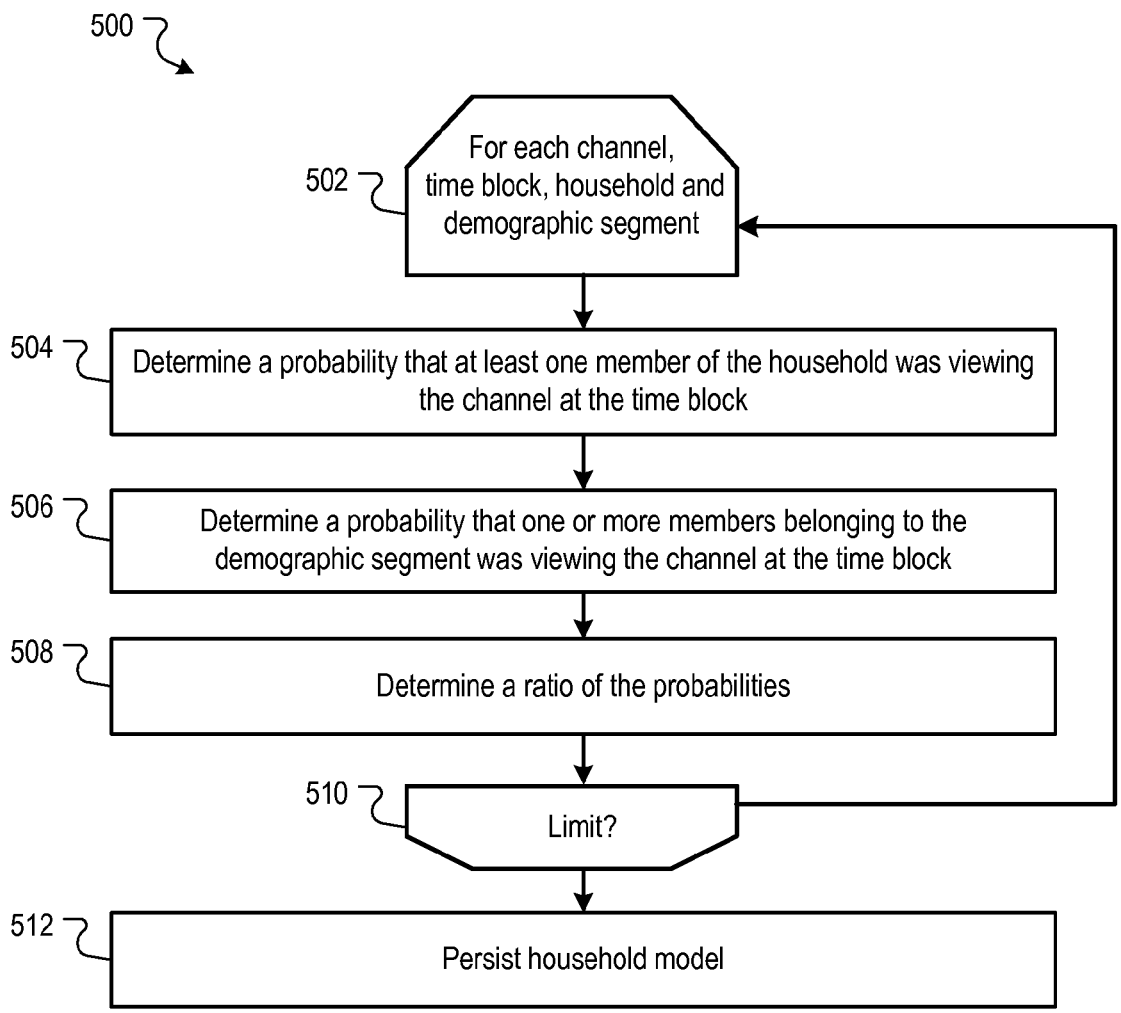
FIG. 5 is a flow diagram of an example process for generating a household model.

FIG. 5 is a flow diagram of an example process 500 for generating a household model. The process 500 can be implemented in a data processing apparatus of one or more computers and memory storage devices that are used to realize the demographic estimation engine 114.

The process 500, for each channel, each time block for the channel, and for each demographic segment (502), determines an expected number of viewers belonging to the demographic segment for the channel at the time block. In some implementations, the process 500 determines the likelihood by determining a probability that at least one member of the household was viewing the channel at the time block (504). For example, the denominator of the final equations in section 4.3 is used to determine this probability.

Then, the process 500 determines a probability that one or more members belonging to the demographic segment was viewing the channel at the time block (506). For example, the numerator of the equation of section 4.3 is used to determine this probability.

The process then determines a ratio of the probabilities (508). For example, the numerator is divided by the denominator to determine the expected number of viewers belonging to the demographic segment for the channel at the time block.

Once all the channels, time blocks, households and demographic segments are processed (510), the demographic estimation engine 114 persists the household model (512).

5.0 Audience Model

Each household contributes fractionally to the demographic segments of an audience. That is, a household h is represented by a vector $(e_{h1Nt} \ldots e_{hDNt})$ that describes its expected number of viewers of network N in time block t in each of the demographic segments for that household. Many of the terms $e_d$ in the household vector are usually zero, due to the number of demographic segments outnumbering the number of members of a typical household.

Given a total of H households, the estimated fraction $A_d$ of the audience of N at time block t in a demographic segment d is the estimated number of viewers in demographic segment d divided by the total number of viewers of network N at channel time block t. The estimated fraction $A_d$ is given by equation (7):

$$A_d = \frac{\sum_{h=1}^{H} e_{hdNt}}{\sum_{s=1}^{D} \sum_{h=1}^{H} e_{hsNt}}. \quad (7)$$

The per-demographic-group audience fractions can be summed to obtain audience fractions for larger demographic, e.g., groups such as "all males" and "all females."

The estimate of equation (7) assumes that the households with data are representative of all viewing households, which may be untrue. However, sampling skew may not seriously bias demographic estimates if millions of households are sampled. With large enough samples, each demographic is represented in the data, even if it is under- or over-sampled. For example, suppose the households skew old relative to the U.S. population. If a program appeals to young male adults and to a lesser extent young female adults, then it will still appeal to those groups in the sample. The sample may have fewer households that are interested in the program, but the demographics of those who are interested may be the same as in the U.S. population as a whole. In other words, it possible to accurately estimate the demographic fractions for a network and time block from a skewed sample.

In some implementations, standard weighting schemes can be used to correct for sample skew. For example, everyone in the sample can be assigned a weight that is proportional to the fraction of the U.S. in their demographic group divided by the fraction of the sample that is in their demographic group. Weighting fractions can also be used to adjust for household skew in other factors, such as a state or a time zone.

In some implementations, to correct the sampling-adjusted ratings-free estimates for bias in the sampled households, the component values of $e_{hdNt}$ of equation (7) are multiplied by the ratio of the fraction of the demographic d in the population to the fraction of the demographic d in the sample.

Figure 6:
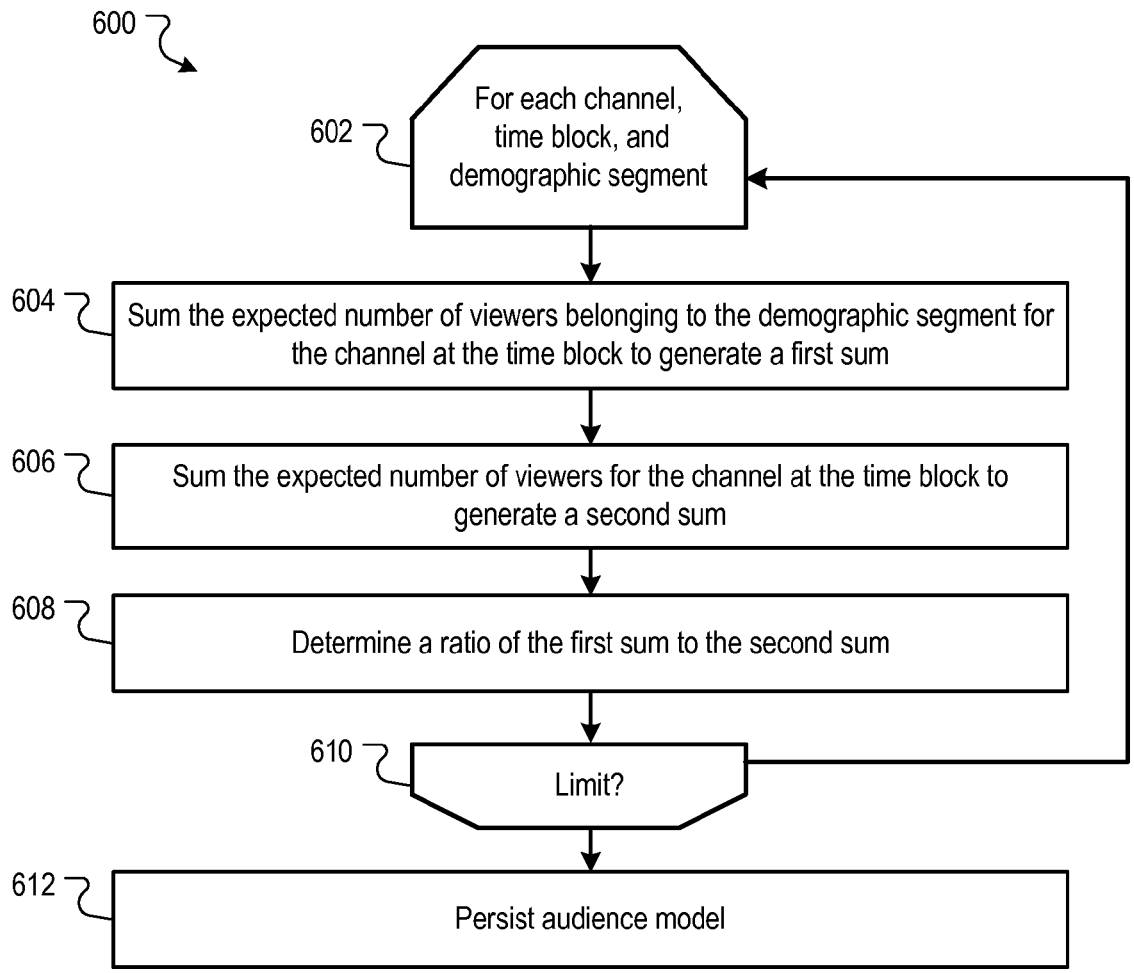
FIG. 6 is a flow diagram of an example process for generating an audience model.

FIG. 6 is a flow diagram of an example process 600 for generating an audience model. The process 600 can be implemented in a data processing apparatus of one or more computers and memory storage devices that are used to realize the demographic estimation engine 114.

The process 600, for each channel, each time block for the channel, and for each demographic segment (602), determining a ratio of an estimated number of viewers of the channel at the time block belonging to the demographic segment to a total number of viewers of the channel at the time block.

For example, the process 600 sums the expected number of viewers belonging to the demographic segment for the channel at the time block to generate a first sum. This is the numerator of equation (7).

The process 600 then sums the expected number of viewers for the channel at the time block to generate a second sum (604). This is the denominator of equation (7).

The process 600 then divides first sum by the second sum (608) to generate the estimate audience fraction $A_d$ for the demographic d.

Once all the channels, time blocks, households and demographic segments are processed (610), the demographic estimation engine 114 persists the audience model (612).

6.0 Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Figure 7:
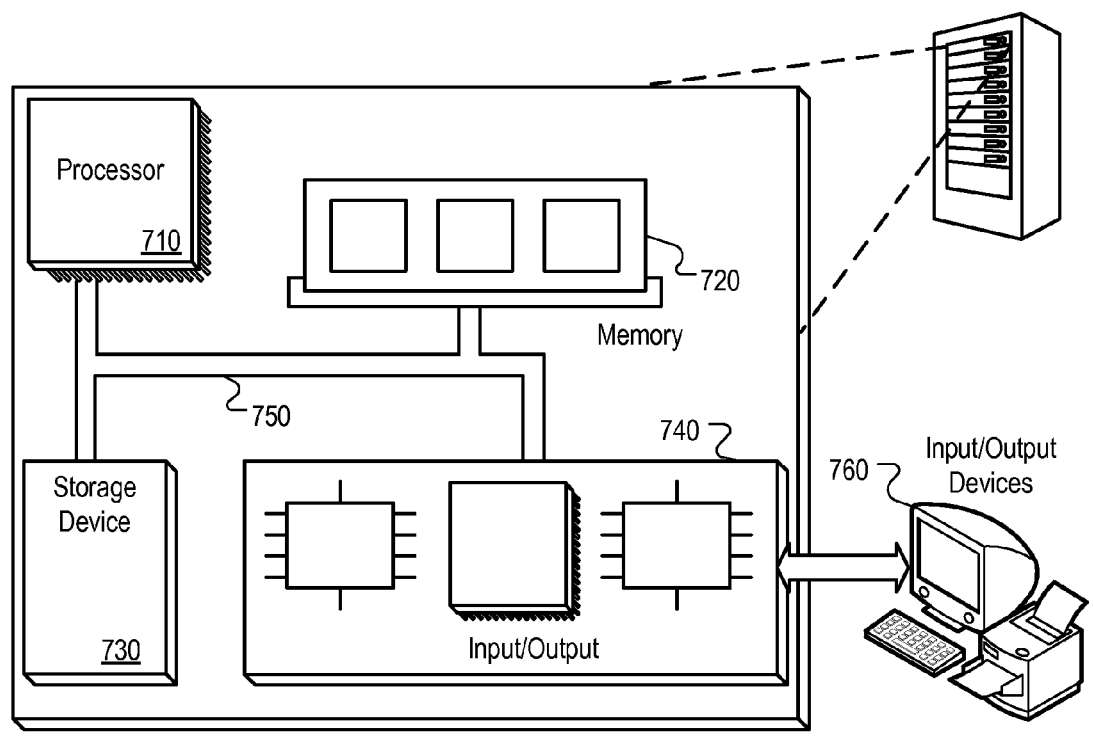
FIG. 7 is a block diagram of a programmable processing system.

An example of one such type of computer is shown in FIG. 7, which shows a block diagram of a programmable processing system (system). The system 700 that can be utilized to implement the systems and methods described herein. The architecture of the system 700 can, for example, be used to implement a computer client, a computer server, or some other computer device.

The system 700 includes a processor 710, a memory 720, a storage device 730, and an input/output device 740. Each of the components 710, 720, 730, and 740 can, for example, be interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 can, for example, include a hard disk device, an optical disk device, or some other large capacity storage device.

The input/output device 740 provides input/output operations for the system 700. In one implementation, the input/output device 740 can include one or more of a network interface device, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 760.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system, comprising:
a data processing apparatus; and
software stored on a computer storage apparatus and comprising instructions executable by the data processing apparatus and upon such execution cause the data processing apparatus to perform operations comprising:
    accessing viewer model data describing, for each of a plurality of demographic segments and for each of plurality of channels at a plurality of time blocks, a probability that a member of the demographic segment was viewing the channel at the time block, the viewer model data being generated using data for one person households, each one person household having only one member;
    accessing household demographic data describing, for each of a plurality of households, one or more members of the household and, for each member of the household, one of the demographic segments to which the member belongs;
    generating household model data from the viewer model data and the household demographic data, the household model data describing, for each of the households and for each demographic segment of the one or more members of the household, an expected number of viewers belonging to the demographic segment for each of the channels at each of the time blocks, wherein generating household model data from the viewer model data and the household demographic data comprises, for each channel at each time block, and for each household and for each demographic segment of members of the household:
        determining a probability that at least one member of the household was viewing the channel at the time block; and
        determining a ratio of the probability that one or more members belonging to the demographic segment was viewing the channel at the time block to the probability that at least one member of the household was viewing the channel at the time block; and
    generating audience model data from the household model data, the audience model data describing, for each demographic segment, an estimated fraction of an audience belonging to the demographic segment for each of the channels at each of the time blocks.

2. The system of claim 1, wherein the instructions cause the data processing apparatus to perform operations comprising:
    accessing channel tune data describing, for each of a plurality of viewing devices, channel tunes for viewing device, each channel tune specifying a channel to which the viewing device tuned to and a time that the viewing device tuned to the channel, each of the viewing devices being associated with a corresponding household; and generating viewer model data from the channel tune data and the household demographic data.

3. The system of claim 2, wherein generating viewer model data from the channel tune data and the household demographic data comprises:
for each of the channels and each of the time blocks, and for each demographic segments:
determining a first number of one person households tuned to the channel at the time block, each of the number of one person households having a member belonging to the demographic;
determining a total number of one person households, each of the total number of one person households having a member belonging to the demographic; and
determining the probability that the member of the demographic segment was viewing the channel at the time block based on a ratio of the first number to the total number.

4. The system of claim 2, wherein determining the probability that at least one member of the household belonging to the demographic segment was viewing the channel at the time block comprises:
for each viewing device associated with the household for which channel tune data corresponding to the channel and time block exist, determining a respective probability that at least member of the household was watching the channel at the time block; and
generating the probability that at least one member of the household was viewing the channel at the time block from the respective probabilities.

5. The system of claim 4, wherein the probability that at least one member of the household was viewing the channel at the time block from the respective probabilities comprises generating a product of the respective probabilities.

6. The system of claim 1, wherein generating audience model data from the household model data comprises, for each channel at each time block, for each demographic segment:
determining a ratio of an estimated number of viewers of the channel at the time block belonging to the demographic segment to a total number of viewers of the channel at the time block.

7. The system of claim 6, wherein determining the ratio of the estimated number of viewers of the channel at the time block belonging to the demographic segment to the total number of viewers of the channel at the time block comprises:
summing the expected number of viewers belonging to the demographic segment for the channel at the time block to generate a first sum;
summing the expected number of viewers for the channel at the time block to generate a second sum; and
dividing the first sum by the second sum.

8. A computer implemented method, comprising:
accessing viewer model data describing, for each of a plurality of demographic segments and for each of plurality of channels at a plurality of time blocks, a probability that a member of the demographic segment was viewing the channel at the time block, the viewer model data being generated using data for one person households, each one person household having only one member;
accessing household demographic data describing, for each of a plurality of households, one or more members of the household and, for each member of the household, one of the demographic segments to which the member belongs;
generating, in a data processing apparatus, household model data from the viewer model data and the household demographic data, the household model data describing, for each of the households and for each demographic segment of the one or more members of the household, an expected number of viewers belonging to the demographic segment for each of the channels at each of the time blocks, wherein generating household model data from the viewer model data and the household demographic data comprises, for each channel at each time block, and for each household and for each demographic segment of members of the household:
determining a probability that at least one member of the household was viewing the channel at the time block; and
determining a ratio of the probability that one or more members belonging to the demographic segment was viewing the channel at the time block to the probability that at least one member of the household was viewing the channel at the time block; and
generating, in the data processing apparatus, audience model data from the household model data, the audience model data describing, for each demographic segment, an estimated fraction of an audience belonging to the demographic segment for each of the channels at each of the time blocks.

9. The method of claim 8, wherein the instructions cause the data processing apparatus to perform operations comprising:
accessing channel tune data describing, for each of a plurality of viewing devices, channel tunes for viewing device, each channel tune specifying a channel to which the viewing device tuned to and a time that the viewing device tuned to the channel, each of the viewing devices being associated with a corresponding household; and
generating viewer model data from the channel tune data and the household demographic data.

10. The method of claim 9, wherein generating viewer model data from the channel tune data and the household demographic data comprises:
for each of the channels and each of the time blocks, and for each demographic segments:
determining a first number of one person households tuned to the channel at the time block, each of the number of one person households having a member belonging to the demographic;
determining a total number of one person households, each of the total number of one person households having a member belonging to the demographic; and
determining the probability that the member of the demographic segment was viewing the channel at the time block based on a ratio of the first number to the total number.

11. The method of claim 9 wherein determining the probability that at least one member of the household belonging to the demographic segment was viewing the channel at the time block comprises:
for each viewing device associated with the household for which channel tune data corresponding to the channel and time block exist, determining a respective probability that at least member of the household was watching the channel at the time block; and
generating the probability that at least one member of the household was viewing the channel at the time block from the respective probabilities.

12. The method of claim 11, wherein the probability that at least one member of the household was viewing the channel at the time block from the respective probabilities comprises generating a product of the respective probabilities.

13. The method of claim 8, wherein generating audience model data from the household model data comprises, for each channel at each time block, for each demographic segment:
  determining a ratio of an estimated number of viewers of the channel at the time block belonging to the demographic segment to a total number of viewers of the channel at the time block.

14. The method of claim 13, wherein determining the ratio of the estimated number of viewers of the channel at the time block belonging to the demographic segment to the total number of viewers of the channel at the time block comprises;
  summing the expected number of viewers belonging to the demographic segment for the channel at the time block to generate a first sum;
  summing the expected number of viewers for the channel at the time block to generate a second sum; and
  dividing the first sum by the second sum.

15. A system, comprising:
  a data storage device storing viewer model data and household demographic data, the viewer model data describing, for each of a plurality of demographic segments and for each of plurality of channels at a plurality of time block, the viewer model data being generated using data for one person households, each one person household having only one member, and the viewer model data defining a probability that a member of the demographic segment was viewing the channel at the time block, and the household demographic data describing, for each of a plurality of households, one or more members of the household and, for each member of the household, one of the demographic segments to which the member belongs;
  means for generating household model data from the viewer model data and the household demographic data, the household model data describing, for each of the households and for each demographic segment of the one or more members of the household, an expected number of viewers belonging to the demographic segment for each of the channels at each of the time blocks, wherein generating household model data from the viewer model data and the household demographic data comprises, for each channel at each time block, and for each household and for each demographic segment of members of the household:
    determining a probability that at least one member of the household was viewing the channel at the time block; and
    determining a ratio of the probability that one or more members belonging to the demographic segment was viewing the channel at the time block to the probability that at least one member of the household was viewing the channel at the time block; and
  means for generating audience model data from the household model data, the audience model data describing, for each demographic segment, an estimated fraction of an audience belonging to the demographic segment for each of the channels at each of the time blocks.

16. The system of claim 15, wherein:
  the data storage device stores channel tune data describing, for each of a plurality of viewing devices, channel tunes for viewing device, each channel tune specifying a channel to which the viewing device tuned to and a time that the viewing device tuned to the channel, each of the viewing devices being associated with a corresponding household; and
  further comprising means for generating the viewer model data from the channel tune data and the household demographic data.

17. A non-transitory computer readable medium storing instructions that, when executed by one or more data processing apparatus, cause the one or more data processing apparatus to perform operations comprising:
  accessing viewer model data describing, for each of a plurality of demographic segments and for each of plurality of channels at a plurality of time blocks, a probability that a member of the demographic segment was viewing the channel at the time block, the viewer model data being generated using data for one person households, each one person household having only one member;
  accessing household demographic data describing, for each of a plurality of households, one or more members of the household and, for each member of the household, one of the demographic segments to which the member belongs;
  generating household model data from the viewer model data and the household demographic data, the household model data describing, for each of the households and for each demographic segment of the one or more members of the household, an expected number of viewers belonging to the demographic segment for each of the channels at each of the time blocks, wherein generating household model data from the viewer model data and the household demographic data comprises, for each channel at each time block, and for each household and for each demographic segment of members of the household:
    determining a probability that at least one member of the household was viewing the channel at the time block; and
    determining a ratio of the probability that one or more members belonging to the demographic segment was viewing the channel at the time block to the probability that at least one member of the household was viewing the channel at the time block; and
  generating audience model data from the household model data, the audience model data describing, for each demographic segment, an estimated fraction of an audience belonging to the demographic segment for each of the channels at each of the time blocks.

18. The computer readable medium of claim 17, wherein the operations further comprise:
  accessing channel tune data describing, for each of a plurality of viewing devices, channel tunes for viewing device, each channel tune specifying a channel to which the viewing device tuned to and a time that the viewing device tuned to the channel, each of the viewing devices being associated with a corresponding household; and
  generating viewer model data from the channel tune data and the household demographic data.

* * * * *